United States Patent Office 2,984,588
Patented May 16, 1961

2,984,588

PROCESS OF PRODUCING A POLYMERIC FILM OF A COPOLYMER OF AN ETHERIFIED N-METHYLOL AMIDE AND AN ETHYLENICALLY UNSATURATED MONOMER

Wilhelm Graulich, Leverkusen-Bayerwerk, Gustav Sinn, Bergisch-Neukirchen, and Karl-Erwin Müller, Leverkusen-Bayerwerk, Germany, assignors to Farbenfabriken Bayer Aktiengesellschaft, Leverkusen, Germany, a corporation of Germany No Drawing. Filed Feb. 28, 1956, Ser. No. 568,157

Claims priority, application Germany Mar. 3, 1955

4 Claims. (Cl. 117—161)

The present invention relates to aqueous emulsions of copolymers as well as to a process for the production of two dimensional bodies from aqueous emulsions of copolymers.

In the copending application Ser. No. 519,241, filed in the name of Wilhelm Graulich and Karl E. Müller on June 30, 1955, which application will be assigned to the same assignee as this application, there is disclosed a process for the production of polymers and copolymers according to which methylol alkyl ethers of polymerizable organic compounds which contain the grouping

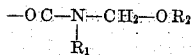

once or several times in the molecule, in which grouping $R_1$ represents hydrogen, alkyl or aryl, and $R_2$ represents alkyl, are polymerized in bulk, in solution or in emulsion, either as such or in admixture with one or more organic compounds which contain at least one polymerizable double bond, to form compounds which are of high molecular weight and which contain methylol ether groups, and if desired these compounds are cross-linked by treatment with alcoholizing agents, more especially acids, or with polyfunctional compounds which are capable of reacting with the said methylol ether groups or the cleavage products thereof which are formed by the action of alcoholizing agents. Particularly suitable methylol alkyl ethers are the methylol alkyl ethers of acrylamide, methacrylamide, the amide of the monoester of maleic acid and fumaric acid and the diamides of such acids.

It has now been found that aqueous emulsions of said copolymers containing methylol ether groups are particularly suitable for the production of two dimensional bodies of all types, such as for example films, coatings and impregnations. The two dimensional bodies obtained from such emulsions are transformed by small amounts of said and/or elevated temperature into substantially insoluble products with excellent mechanical properties.

Compounds containing methylol ether groups, which are suitable according to the invention, are e.g. the alkyl ethers of the methylol compounds of acrylamide, methacrylamide, sorbic acid amide, the diamides of muconic acid and fumaric acid as well as the alkyl ethers of the methylol compounds of ethylenically unsaturated urethane, such as those of allyl urethane and unsaturated ureas. The term "alkyl ethers" as herein used is intended to include both alkyl and isoalkyl derivatives. Of these compounds the alkyl ethers, the alkyl groups of which have 1–4 C atoms, preferably the methyl ethers, of the methylol compounds of acrylamide and methacrylamide have been found to be especially valuable.

The aforesaid alkyl ethers are obtainable by reacting the methylol compounds, as for instance those of the α-β-ethylenically unsaturated carboxylic acid amides, with an alcohol in the presence of an acid catalyst, such as gaseous hydrochloric acid (compare in this connection application Serial No. 518,954, filed June 29, 1955, in the name of Karl E. Müller and Hans Holtschmidt, which application will be assigned to the same assignee as this application).

On principle, all organic compounds containing one or more polymerizable double bonds are suitable according to the invention to produce the herein described copolymers. As examples may be mentioned butadiene, its homologues and derivatives e.g. isoprene, dimethyl butadiene, 2-chlorobutadiene, styrene and its polymerizable substitution products, e.g. p-chlorostyrene, acrylonitrile, methacrylonitrile, acrylic and methacrylic acid, esters of said acids with aliphatic and cycloaliphatic alcohols, such as methanol, butanol, oleylalcohol, cyclohexanol, acrylic acid amides, the amide residues of which are unsubstituted or substituted by aliphatic or cycloaliphatic residues, e.g. acrylic acid amide, acrylic acid mono- and dimethylamide, methacrylic acid mono- and dibutylamide, acrylic acid mono- and di-cyclohexylamide, methacrylic acid amide, vinyl chloride, vinylidene chloride and organic vinyl esters, such as vinyl acetate. Copolymers with particularly valuable properties are obtained if the methylol ethers are used in lower quantities than the other components. Therefore, the methylol ether compounds are preferably applied in quantities of about 0.5 to about 30 mol percent, more especially of 1 to 10 mol percent, calculated on the amount of the other components used in the copolymerization process.

It is a surprising feature of the invention that the aforesaid compounds, especially the methylol alkyl ethers of methacrylamide are incorporated despite their good water solubility in copolymers which are produced by conventional methods in aqueous emulsion with water-insoluble, organic polymerizable compounds.

The polymerization process of the invention can be accelerated by addition of the known substances forming radicals e.g. peroxides, peracids and salts thereof; it is of advantage to apply the known redox systems to maintain the polymerization temperature low thus avoiding premature cleavage and condensation reaction of the methylol ether group. The height of the molecular weight and the length of the chains of the polymers obtained can be varied by means known per se such as by addition of regulating substances (see W. Graulich and W. Becker, Zeitschrift für makromol. Chemie 3 (1949), pages 53–771), or by varying the amount of the activator used and the reaction temperature.

By choosing suitable components for the production of the copolymers, it is possible to influence considerably the properties of the products obtained by the process of the invention.

For example, particularly flexible and strong films are obtained by using large amounts of butadiene, while particularly flexible and soft films, which when applied to textile fabrics do not deleteriously effect the feel of the fabrics, are obtained by using acrylic acid esters or the vinyl ethers of higher alcohols. Moreover, the use of dichloroethene as copolymerization component produces elastic films, whereas styrene and esters of acrylic and methacrylic acid lead, when used in large amounts, to particularly clear films and coatings while acrylonitrile produces particularly hard films and coatings. The proportion of the monomers containing methylol ether groups in the polymer determines the degree of cross-linking. Since too high a degree of cross-linking generally results in the film produced becoming brittle, the proportion of these monomers in the polymer is kept comparatively low and in a normal case comprises a maximum of up to 30%, but preferably between 1 and 10% of the initial monomers. The aqueous copolymer emulsions which are obtained according to well known processes contain generally copolymers in amounts of 30 to 50% by weight.

The copolymers obtained according to the invention carry reactive methylol ether groups. These reactive methylol ether groups can be split up under the influence of alcoholizing agents, e.g. organic and inorganic acids, such as mineral acids, phosphoric acid, acetic acid, trichloroacetic acid, p-toluene sulfonic acid, lactic acid if desired at elevated temperature of about 80–200° C. These acids are preferably applied in such quantities, that the pH-value of the emulsion is less than 6, preferably 2–5. Since the emulsions of acid pH values are not stable such emulsions must be worked up as soon as possible after compounding. It is furthermore possible to split up the methylol ether groups by heating the copolymerizates as they are obtained after spreading and drying the emulsion to temperatures of about 100–200° C. preferably 120–150° C. for a few minutes.

It has also proved particularly valuable to add to the above emulsions a water-soluble resin-forming condensation product of an aldehyde, more especially formaldehyde with phenols, such as phenol, cresol, p-chlorophenol, p-tert. butylphenol, urea, dicyandiamide, melamine or phenyl sulphonamide. It is preferable not to use the corresponding monomolecular reaction products, but to use a condensation product which is water soluble. The addition of these products participating in the spontaneous cross-linking makes the cross-linking reaction even more intensive. If cross-linking agents are added the amounts to be added depend on the properties which are required of the sheet products. They are preferably applied in quantities amounting to about 0.5–50, preferably 1–25 percent by weight as calculated on the amount of copolymerizate.

During the processing of the copolymer emulsions, care is to be taken that a premature cross-linking and thus a gelling of the emulsions is avoided. Consequently, the aqueous emulsions are preferably adjusted to a neutral or slightly alkaline condition (pH value about 6.5–9) for instance by addition of ammonia or sodium carbonate. It is therefore prefered to carry out the polymerization in an weakly alkaline medium. In case that acrylic and methacrylic acid are used as copolymerizable components, they are applied in form of their salts, preferably ammonium salts. If necessary catalysts are added, which liberate an acid under the influence of elevated temperature in an amount sufficient to overcompensate the amount of alkaline agents present. Such catalysts are for instance the salts of mineral or organic acids with ammonia, such as ammonium phosphate, ammonium nitrate. There may also be used acid catalysts as pointed out above.

The usual fillers, plasticizers, pigments and other products can be added to the emulsions. It is also desirable to use anti-oxidizing agents when copolymers of butadiene or its derivatives are employed. For vulcanizing the sheet products which are obtained by using the above-described butadiene copolymers or butadiene-acrylonitrile copolymers, it is not necessary to make use of the conventional vulcanization additives such as sulphur, accelerators and zinc oxide.

The emulsions which have been described are suitable for the production of any desired two dimentional bodies by the methods usual for the processing of latices of natural or synthetic rubber and of other polymer emulsions. They can be applied by brushing, spraying, dipping, casting or by means of coating rollers of doctors. The emulsions are also suitable for the production of shaped bodies elements. The processing is preferably carried out by heating the coatings, produced from the emulsions which have been initially substantially freed from water, to temperatures higher than 70° C. and preferably between 10 and 150° C. for producing the cross-linking. The upper temperature limit is determined by the sensitivity to temperature of the support and also of the coatings themselves. For the production of impregnations on fabrics or yarns, the necessary cross-linking can be produced, for example by heating for 5 to 10 minutes at temperatures of about 145° C.

In the following examples, the parts indicated are parts by weight.

Example 1

The methyl methylol ether of acrylamide is obtained in the following manner:

95 grams of methylol acrylamide are dissolved in 400 cc. of methanol and gaseous hydrogen chloride is introduced until there is a distinct acid reaction to Congo red. The solution is heated to about 40 to 45° C. and it is neutralized after about 20 minutes by adding solid sodium bicarbonate. After filtering, the methanol is evaporated in vacuo and the methylol ether formed distilled under high vacuum. Boiling point: 91° C. at a pressure of 0.5 mm., and the yield is 76 grams.

For preparing a copolymer of said ether 5 parts of the sodium salt of the sulfonic acid of long-chain paraffines having 10–20 C-atoms are dissolved in 150 parts of water, 0.35 part of potassium persulfate, and 0.75 part of triethanolamine are added, and 60 parts of butadiene, 37 parts of acrylonitrile and 3 parts of the methyl methylol ether of acrylamide are emulsified in the solution. The emulsion, which has the pH-value 7.5 is polymerized at 25° C. for 10 hours with stirring. A latex is obtained which contains 42% of copolymer. This latex is stabilized with 3 parts of phenyl-β-naphthylamino, and is cast on to a porcelain slab and dried in air. T-shaped test elements were stamped out of the film thus obtained and heated at 135° C. The following values were obtained:

|  | Percent elongation |
|---|---|
| 15′ heating time, 70 kg./cm.² strength | 700 |
| 30′ heating time, 80 kg./cm.² strength | 580 |
| 45′ heating time, 75 kg./cm.² strength | 520 |

Example 2

A latex of a copolymer of 70 parts of butadiene, 25 parts of styrene and 5 parts of the methyl methylol ether of methacrylamide is produced according to the prescription of Example 1. This latex is stabilized with 3% of O.O′-ter-butyl-p-cresol (based on solid content) and combined with 10 parts (to 100 parts of solid polymer) of a water-soluble condensation product of urea and formaldehyde produced in the presence of catalytic amounts of triethanolamine, said product being capable of being condensed to cured resins. Two parts of ammonium phosphate are used as cross-liking activator. Test elements are prepared as described in Example 1 and the following values are obtained:

|  | Percent elongation |
|---|---|
| 15′ heating time, 40 kg./cm.² strength | 800 |
| 30′ heating time, 65 kg./cm.² strength | 500 |
| 45′ heating time, 60 kg./cm.² strength | 480 |

Example 3

A latex of a copolymer of 40 parts of styrene, 50 parts of acrylic acid butyl ester and 10 parts of the methyl methylol ether of methacrylamide is produced according to the prescription of Example 1. The latex is mixed with 2% of lactic acid, cast on to a glass plate, initially dried at room temperature and then finally heated at 105° C. Even after 10 minutes, the film is still more swelled in chlorobenzene, whereas a film of a copolymer of corresponding parts of styrene and acrylic acid butyl ester produced in the same manner is immediately dissolved in chlorobenzene.

Example 4

A latex of a copolymer of 30 parts of acrylonitrile, 75 parts of acrylic acid butyl ester and 5 parts of the methyl methylol ether of acrylamide is prepared according to the process of Example 1. After 2% of maleic acid (based on polymer content) had been dissolved in said latex, this was used for impregnating a filter paper. After condensing the impregnation by heating at 115° C., the paper shows high wet and dry strength values, and the finish is no longer soluble in acetone.

What we claim is:

1. A process for the production of a polymeric film which comprises (1) applying to a support a storage-stable aqueous emulsion of a linear water-insoluble copolymer, containing etherified N-methylol groups, of (A) an alpha,beta-monoethylenically unsaturated amide selected from the group consisting of acrylamide, methacrylamide, maleic acid diamide, fumaric acid diamide, sorbic acid amide, and muconic acid diamide, in which one of the hydrogen atoms of an amide group is replaced by a —$CH_2$—O-alkyl group of 1 to 4 carbon atoms, and (B) a monomer copolymerizable therewith selected from the group consisting of a 4 to 6 carbon conjugated diene and a monoethylenically unsaturated organic compound in which the $CH_2$=CH-group is the sole group capable of taking part in the copolymerization, said compound (A) being present in an amount of 0.5–30 mole percent based on the amount of the said second monomer, said aqueous emulsion having been adjusted to a pH of about 6.5 to 9 in order to prevent cross-linking of the copolymer during storage, followed by (2) heating the latex coating to a temperature of about 70–200° C. to form a cross-linked polymer.

2. A process for the production of a polymeric film which comprises (1) applying to a support a storage-stable aqueous emulsion of a linear water-insoluble copolymer, containing etherified N-methylol groups, of (A) an alpha,beta-monoethylenically unsaturated organic compound selected from the group consisting of acrylamide, methacrylamide, maleic acid diamide, fumaric acid diamide, sorbic acid amide, and muconic acid diamide, in which one of the hydrogen atoms of an amide group is replaced by a —$CH_2$—O-alkyl group of 1 to 4 carbon atoms, and (B) a monomer copolymerizable therewith selected from the group consisting of a 4 to 6 carbon conjugated diene and a monoethylenically unsaturated organic compound in which the $CH_2$=CH-group is the sole group capable of taking part in the copolymerization, said compound (A) being present in an amount of 0.5–30 mole percent based on the amount of said second monomer, said aqueous emulsion containing and dissolved therein a water-soluble resin-forming condensation product of an aldehyde with at least one compound selected from the group consisting of phenols, ureas, thioureas, dicyandiamides, melamine, and sulfonamides, said condensation product being present in an amount of about 0.5–50% by weight of the copolymer, the emulsion having been adjusted to a pH value of about 6.5 to 9 in order to prevent cross-linking of the copolymer during storage, followed by (2) lowering the pH of the emulsion coating to a value below 6 and heating to form a cross-linked polymer.

3. A process for the production of a polymeric film which comprises applying to a support a storage-stable latex of a linear water-insoluble copolymer of an N-methylol alkyl ether of acrylamide with a monomer selected from the group consisting of a 4–6 carbon conjugated diene and a monoethylenically unsaturated compound in which the CH=CH-group is the sole group capable of participating in the copolymerization, said methylol alkyl ether of acrylamide being present in an amount of 0.5–30 mole percent based on the second monomer, and subsequently heating said latex coating to a temperature of about 70–200° C. to form a cross-linked polymer.

4. A process for the production of a polymeric film which comprises applying to a support a storage-stable latex of a linear water-insoluble copolymer of an N-methylol alkyl ether of methacrylamide with a monomer selected from the group consisting of a 4–6 carbon conjugated diene and a monoethylenically unsaturated compound in which the $CH_2$=CH-group is the sole group capable of participating in the copolymerization, said methylol alkyl ether of methacrylamide being present in an amount of 0.5–30 mole percent based on the second monomer, and subsequently heating said latex coating to a temperature of about 70–200° C. to form a cross-linked polymer.

References Cited in the file of this patent

UNITED STATES PATENTS

| 2,173,005 | Strain | Sept. 12, 1939 |
| 2,504,857 | MacIntyre | Apr. 18, 1950 |
| 2,541,465 | Dickey | Feb. 13, 1951 |
| 2,582,961 | Burnell | Jan. 22, 1952 |
| 2,719,832 | Craemer | Oct. 4, 1955 |
| 2,870,116 | Vogel et al. | Jan. 30, 1959 |

OTHER REFERENCES

Schildknecht: "Vinyl and Related Polymers," page 321, February 20, 1952, John Wiley and Sons, Inc., New York.